A. R. BERCK & F. TJADEN.
AIR COMPRESSOR.
APPLICATION FILED MAR. 29, 1915.

1,255,694.

Patented Feb. 5, 1918.

WITNESSES
L. Hauerstein
B. Joffe

INVENTORS
Alvin R. Berck
Fred Tjaden
BY
ATTORNEYS

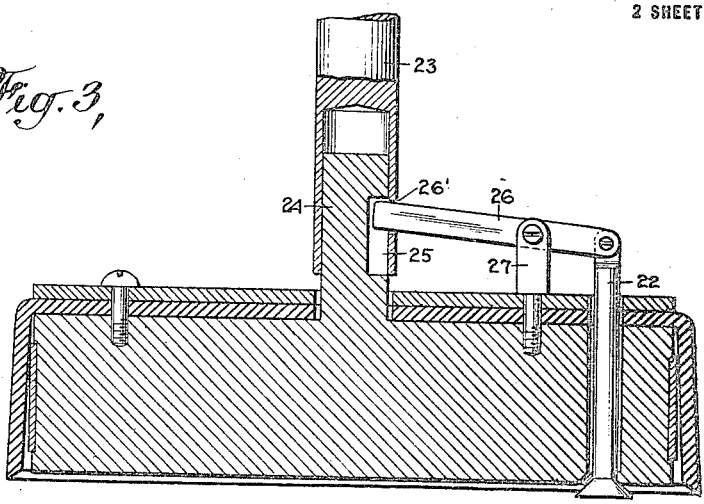
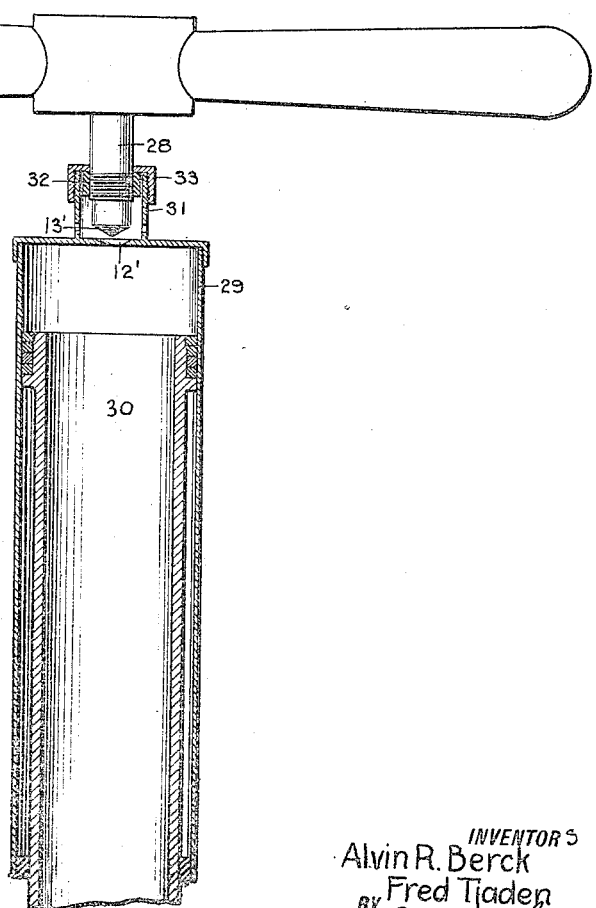

UNITED STATES PATENT OFFICE.

ALVIN R. BERCK AND FRED TJADEN, OF HASTINGS, NEBRASKA.

AIR-COMPRESSOR.

1,255,694.

Specification of Letters Patent.

Patented Feb. 5, 1918.

Application filed March 29, 1915. Serial No. 17,737.

*To all whom it may concern:*

Be it known that we, ALVIN R. BERCK and FRED TJADEN, citizens of the United States, and residents of Hastings, in the county of Adams and State of Nebraska, have invented a new and Improved Air-Compressor, of which the following is a full, clear, and exact description.

Our invention relates to air compressors, and has reference more particularly to the operation of the air valve of the compressor. The object of the invention is to provide a simple, strong, efficient and inexpensive compressor characterized by an air valve operated mechanically by the initial displacement of the piston rod relative to the piston or its equivalent.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Fig. 3 is a modified structure of the valve-operating means; and

Fig. 4 is a further modification of the application of the air inlet valve to the compressor.

Figure 1:
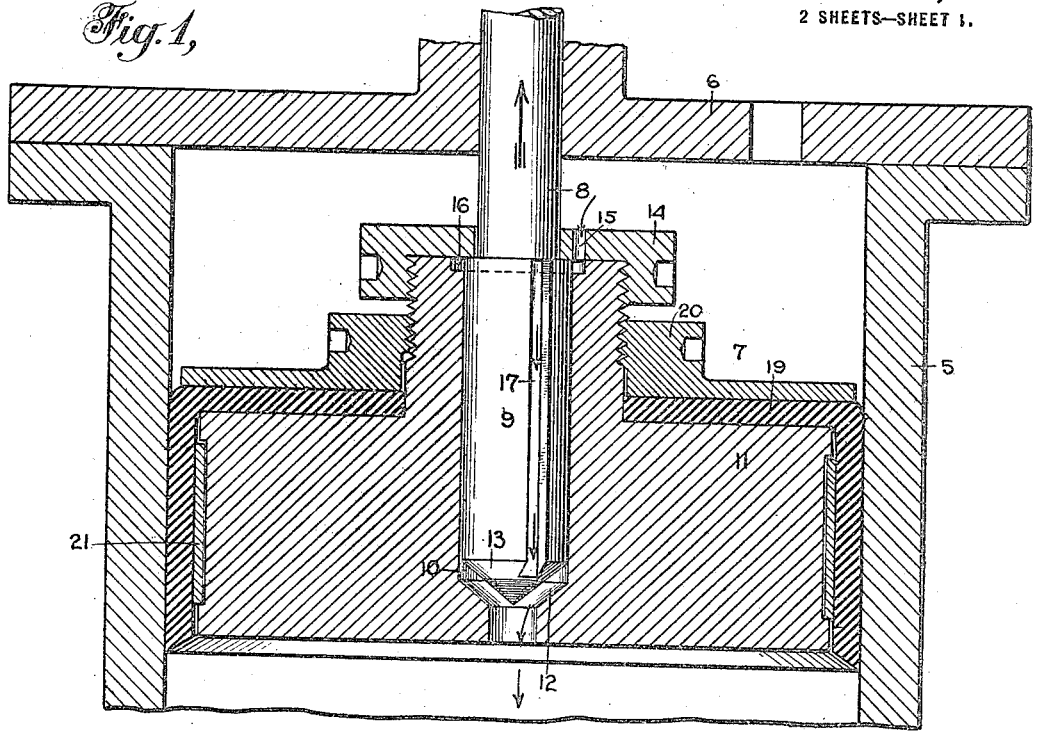
Figure 1 is a section through a compressor cylinder provided with an embodiment of our invention.
Figure 2:
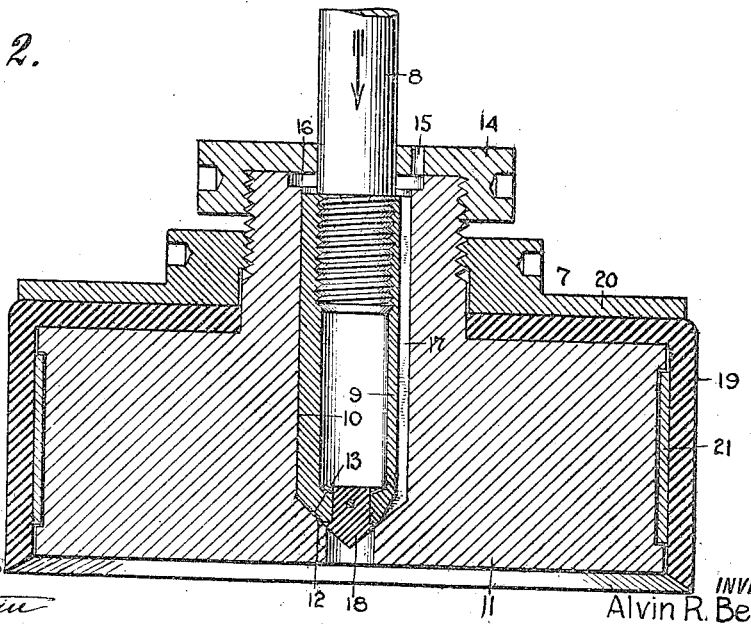
Fig. 2 is a similar section showing a different position of the inlet valve.

Before proceeding to a more detailed description of our invention, it will be clearly understood that although all the figures disclose a vertical compressor, the structure can be as efficiently used with a horizontally-disposed air compressor.

Referring to the drawings, 5 represents the cylinder, one end of which is provided with an apertured cover 6. The other end, which carries the outlet valve, is not shown. Mounted to reciprocate within the cylinder 5 is a piston 7, the piston rod 8 of which projects through the cover 6. The said piston rod 8 has an enlarged portion 9 fitting snugly into a central bore 10 provided in a piston block 11. This enlarged portion is preferably formed by a sleeve threaded on to the piston rod. A portion of the bore is reduced, so as to form a seat 12 to be engaged by a cone-shaped end 13 of the enlarged portion 9 of the piston rod. This end of the piston rod forms a valve which controls the flow of air through the bore 10. The portion 9 of the piston rod is limited in its movement within the bore 10 by a nut 14 which is adapted to be engaged by the enlarged portion 9. An opening 15 is provided in the nut which leads to an annular recess 16 concentric with the bore 10 of the piston block 11 at the nut.

The enlarged portion 9 of the piston rod has a longitudinal groove 17 which establishes communication between the recess 16 and the narrower portion of the bore 10 when the valve 13 is off its seat 12. When the valve 13 engages the seat 12, the communication is interrupted, and, consequently, the flow through the piston. The valve 13 has preferably a fibrous tip 18, so that the same will slightly give when the valve 13 engages the seat, and thus form a more perfect closure.

The piston block 11 carries a leather cup 19 which is secured to the block 11 by a flange 20 threaded on the block below the nut 14. A spreader 21 is provided on the block to force the lateral surface of the cup against the walls of the cylinder 5.

The operation of our compressor is as follows: As the piston moves upward, the valve 13 is off its seat; consequently, the air will flow, as stated, through the piston block. When the nut 14 reaches the cover 6, the returning movement of the piston will be preceded by an initial displacement of the piston rod 8, consequently, bringing the valve 13 against the seat 12 before the piston moves, thus cutting off positively any escape for the air which may be inclosed between the piston and the outlet valve, not shown. In the downward movement of the piston the pressure on the piston will increase proportionately; and to overcome the said resistance pressure will have to be applied to the piston rod; thus, the higher the resistance offered by the air to be compressed by the piston, the higher is the pressure which will bring the valve 13 against its seat. Therefore, there is no danger of leakage through the valve, although the valve unseats itself in the direction of the resistance offered to the movement of the piston. It may be remarked that the pressure seating the valve 13 exceeds the total pressure on the piston end which faces the outlet valve. When the piston has reached the end of its stroke and begins its return stroke, the piston rod 8 will receive an initial displacement, unseating the valve mechanically and thus establishing communication between the two ends of the piston.

In the modification shown in Fig. 3, a valve 22 is independent of the piston rod 23. In this structure the piston rod 23 is adapted to slide on a stem 24 forming an integral part of the piston block. In this stem 24 an elongated recess 25 is formed which is engaged by one end of a lever 26 which projects through an aperture 26' provided in the piston rod 23. The other end of the lever 26 is pivotally connected to the end of the valve 22 projecting through the piston block. The lever 26 is pivoted between its ends and a bracket 27 which is carried by the piston block. The downward movement of the piston will be preceded by an initial displacement of the piston rod which will mechanically seat the valve 22 before the pressure in the cylinder is high enough to move the valve 22 against its seat. Therefore, there is no chance for any air to escape at the beginning of the return movement of the piston. The same reasoning applies to the previous description. In this structure the valve will be maintained against its seat, in addition to the pressure applied to the piston rod 23 by the pressure of the air between the piston and the outlet end of the cylinder.

In the structure of Fig. 4, the valve 13' is formed at the end of a plunger rod 28, the seat 12' for which is provided in the end of a plunger shell 29 which surrounds a cylinder 30. The plunger rod 28 has a movement relative to the plunger shell 29 within a socket 31, forming an integral part of the top end of the shell. A nut 32 carried by the plunger rod is adapted to engage a cap 33 threaded on to the socket 31. The socket is apertured so as to allow a flow of air therethrough. The portion of the structure shown in Fig. 4 is similar to what has been described.

While we have described the principle of operation, together with the device which we now consider to be the best embodiment thereof, we desire to have it understood that the device shown is merely illustrative and that such changes may be made as are within the scope of the appended claims.

We claim:

1. In an air compressor, the combination of a cylinder, a piston in the cylinder and having a central bore, the upper end of which is enlarged and the lower end reduced, to form a valve seat, a piston rod mounted in the bore and having a cone-shaped lower end forming a valve adapted to engage the seat of the bore, the portion of the piston rod in the bore having limited movement therein and provided with a longitudinal passage, and an apertured closure for the bore and through which the piston rod passes.

2. In an air compressor, the combination of a cylinder, a piston in the cylinder and having a central bore and a recess concentric with the upper end of the said bore, the lower end of the bore being reduced to form a valve seat, an apertured cover for the bore of the piston, and a piston rod extending through the cover into the bore of the piston and provided in said bore with an enlarged portion having a cone-shaped lower end and a longitudinal passage, the enlarged portion of the piston being of less length than the length of the bore and adapted to engage the cover.

In testimony whereof we have signed our names to this specification in the presence of two subscribing witnesses.

ALVIN R. BERCK.
FRED TJADEN.

Witnesses:
C. E. KINSEY,
B. F. ROHRER.

Copies of this patent may be obtained for five cents each, by addressing the "Commissioner of Patents, Washington, D. C."